(12) United States Patent
Galic et al.

(10) Patent No.: US 8,123,105 B2
(45) Date of Patent: Feb. 28, 2012

(54) PROCESS FOR BRAZING WIDE GAPS

(75) Inventors: Raoul Galic, Mülheim an der Ruhr (DE); Brigitte Heinecke, Mülheim an der Ruhr (DE); Margarete Neuhaus, Ewighausen (DE); Claus Krusch, Mülheim an der Ruhr (DE); Volker Vosberg, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/743,440

(22) PCT Filed: Nov. 11, 2008

(86) PCT No.: PCT/EP2008/065284
§ 371 (c)(1),
(2), (4) Date: Jan. 18, 2011

(87) PCT Pub. No.: WO2009/065753
PCT Pub. Date: May 28, 2009

(65) Prior Publication Data
US 2011/0174867 A1 Jul. 21, 2011

(30) Foreign Application Priority Data
Nov. 20, 2007 (EP) .................. 07022503

(51) Int. Cl.
*B23K 20/02* (2006.01)
*B23K 1/00* (2006.01)

(52) U.S. Cl. ............ 228/119; 228/248.1; 228/170
(58) Field of Classification Search ........... 228/119, 228/303, 248.1, 170
See application file for complete search history.

(56) References Cited

U.S. PATENT DOCUMENTS

| | | | |
|---|---|---|---|
| 6,024,792 A | 2/2000 | Kurz et al. | |
| 6,520,401 B1 | 2/2003 | Miglietti | |
| 2002/0020734 A1* | 2/2002 | Meier | 228/119 |

FOREIGN PATENT DOCUMENTS

| | | |
|---|---|---|
| EP | 0486489 B1 | 11/1994 |
| EP | 0412397 B1 | 3/1998 |
| EP | 0836904 A2 | 4/1998 |
| EP | 0892090 A1 | 2/1999 |
| EP | 0786017 B1 | 3/1999 |
| EP | 1319729 A1 | 12/2001 |
| EP | 1306454 A1 | 5/2003 |
| EP | 1204776 B1 | 6/2004 |
| EP | 1623787 A1 * | 2/2006 |
| WO | WO 99/67435 A1 | 12/1999 |
| WO | WO 00/44949 A1 | 8/2000 |

* cited by examiner

*Primary Examiner* — Jessica L Ward
*Assistant Examiner* — Erin Saad

(57) ABSTRACT

A method for repairing wider gaps in a substrate of a component by brazing at a brazing temperature is provided. Filler material and solder are prevented from separating in that, in a two-stage process, first the filler material and then the solder are applied to the wider gap. The powder does not melt at the brazing temperature and the filler metal does melt at the brazing temperature.

9 Claims, 5 Drawing Sheets

FIG 5

| Material | Chemical composition in % | | | | | | | | | | | | |
|---|---|---|---|---|---|---|---|---|---|---|---|---|---|
| | C | Cr | Ni | Co | Mo | W | Ta | Nb | Al | Ti | B | Zr | Hf |
| Ni-base investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-base investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

PROCESS FOR BRAZING WIDE GAPS

CROSS REFERENCE TO RELATED APPLICATIONS

This application is the US National Stage of International Application No. PCT/EP2008/065284, filed Nov. 11, 2008 and claims the benefit thereof. The International Application claims the benefits of European Patent Office application No. 07022503.2 EP filed Nov. 20, 2007. All of the applications are incorporated by reference herein in their entirety.

FIELD OF INVENTION

The invention relates to a process for brazing wide gaps.

BACKGROUND OF INVENTION

Within the context of the refurbishment of hot-gas components, it may be necessary to provide defects, such as wide gaps which cannot be filled by means of the conventional narrow-gap brazing process, with a filling which can be subjected to mechanical stresses.

During narrow-gap brazing, a mixture of high-temperature filler metal base material is applied to the defect as a deposit in order to allow the high-temperature filler metal to soak into the gap during the brazing cycle utilizing the capillary effect.

The process cannot be applied to wide gaps owing to the excessively low capillary effect, since the gap is not filled or is filled only insufficiently.

An alternative method for applying filler metal is to fill the gap mechanically with the mixture of filler metal base material. In the case of relatively large gap depths and gap widths, however, this results in separation of filler metal and base material or at least in non-uniform distribution of filler metal and base material.

SUMMARY OF INVENTION

It is therefore an object of the invention to disclose a process which overcomes the problems mentioned above.

The object is achieved by a process as claimed in the claims.

The dependent claims list further advantageous measures which can be combined with one another as desired in order to obtain further advantages.

BRIEF DESCRIPTION OF THE DRAWINGS

FIG. 5 shows a list of superalloys.

DETAILED DESCRIPTION OF INVENTION

Figure 1:
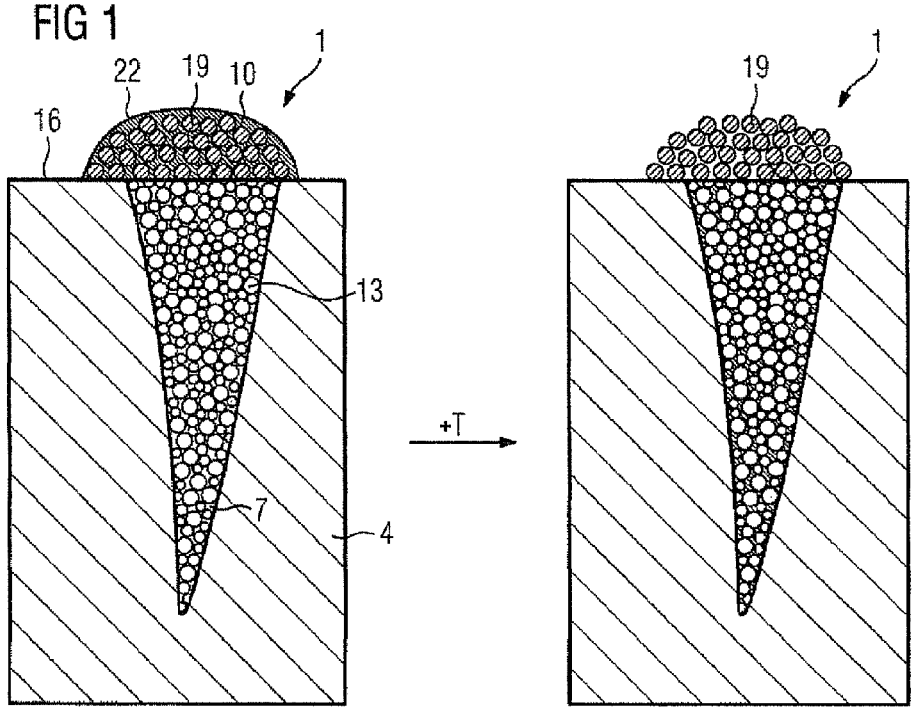
FIG. 1 schematically shows the course of the process according to the invention.

FIG. 1 schematically shows the course of the process.
The component 1, 120, 130, 155 has a substrate 4, preferably consisting of a nickel-base or cobalt-base superalloy as shown in FIG. 5.
There is a wide gap 7 in the substrate 4.
Wide gaps are gap widths greater than 1 mm, in particular greater than 2 mm and very particularly up to 3 mm.
Here, the gaps preferably have a depth of at least 1 mm.

The gap 7 is preferably cleaned of impurities such as oxides or corrosion products. Thereafter, or instead of the removal of the oxides by a chemical treatment, the gap 7 is preferably processed mechanically in order to produce a defined contour.

In a first step, a powder 13, which does not melt at a brazing temperature $T_L$ of a filler metal 10, is introduced into the gap 7. This is preferably a material similar in nature to the substrate 4 or preferably a material which contains the same material of the substrate 4 and, in particular, consists thereof. This may preferably also be a ceramic.

The powder 13 can be introduced in different ways, e.g. by dry spreading, by cold spraying, by slurry introduction, etc.

The gap 7 is filled with the powder 13, in particular up to a surface 16 of the substrate 4.

The powder 13 does not melt at the brazing temperature $T_L$.

A filler metal 10 is then applied to the surface 16 in the region of the gap 7. The filler metal 10 preferably contains deposit grains 19 and a filler metal deposit 22 of a filler metal alloy for stabilization at the brazing temperature.

The deposit grains have to be wettable in the pasty state and must not melt at brazing temperature. If these are not base material grains, introduction into the gap during the brazing owing to the size of the grains has to be prevented.

Since the gap 7 is already filled with the powder 13, it is possible to stabilize the filler metal deposit (paste) using a carrier which is wetted in the pasty state of the deposit, but not by the molten filler metal.

During heat treatment (brazing), the filler metal deposit 22 melts and, owing to the capillary effect in the capillaries produced by the grains of the powder 13, is drawn into the gap 7, and therefore the gap 7 is filled completely.

In the last step, the deposit grains 19, which may be used, can be removed.

The wide gap 7 is now filled completely and has a uniform distribution of the powder 13, a filler metal matrix, i.e. for example a base material, and filler metal material, and therefore a high mechanical strength is obtained here.

Figure 2:
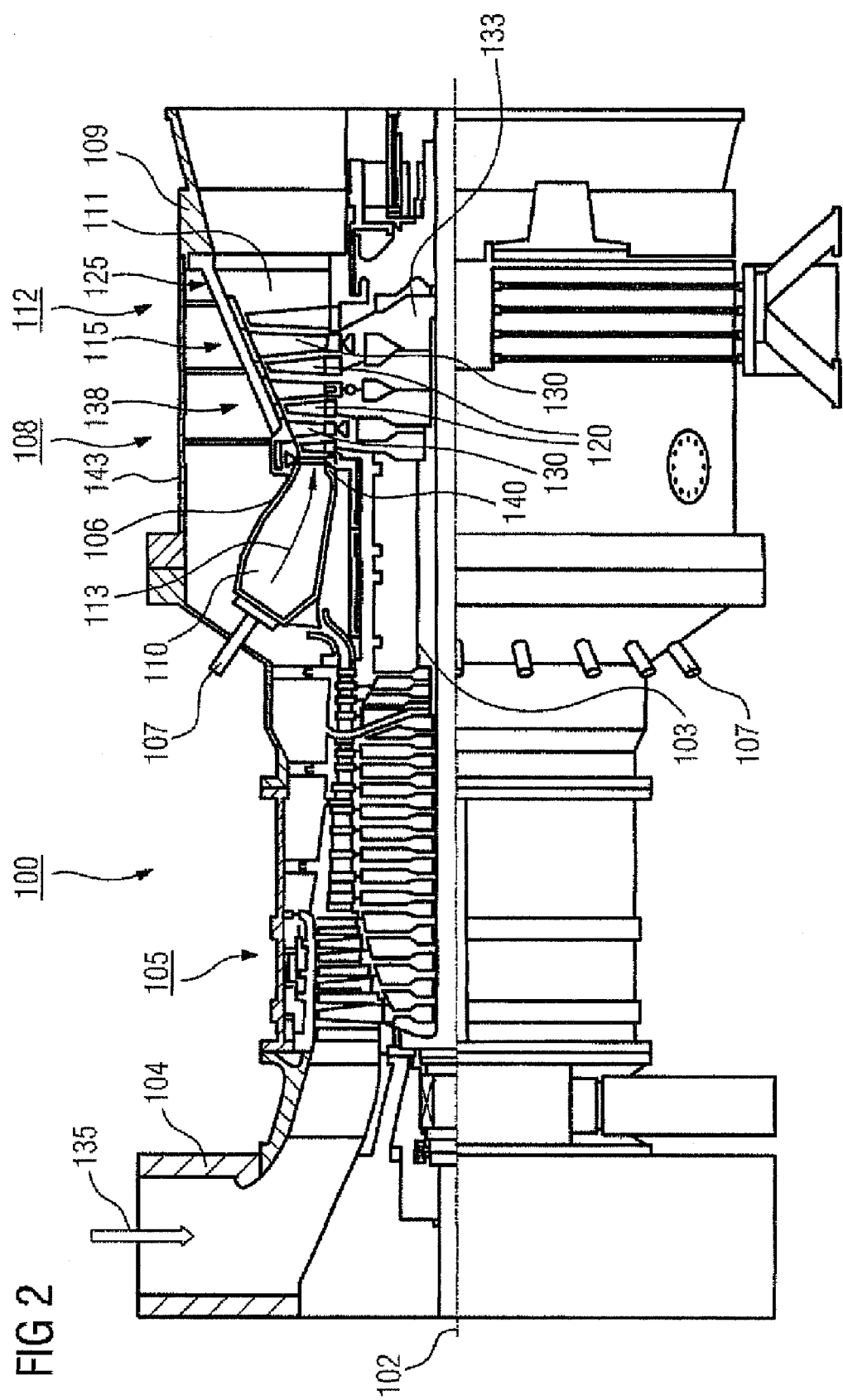
FIG. 2 shows a gas turbine.

FIG. 2 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 3:
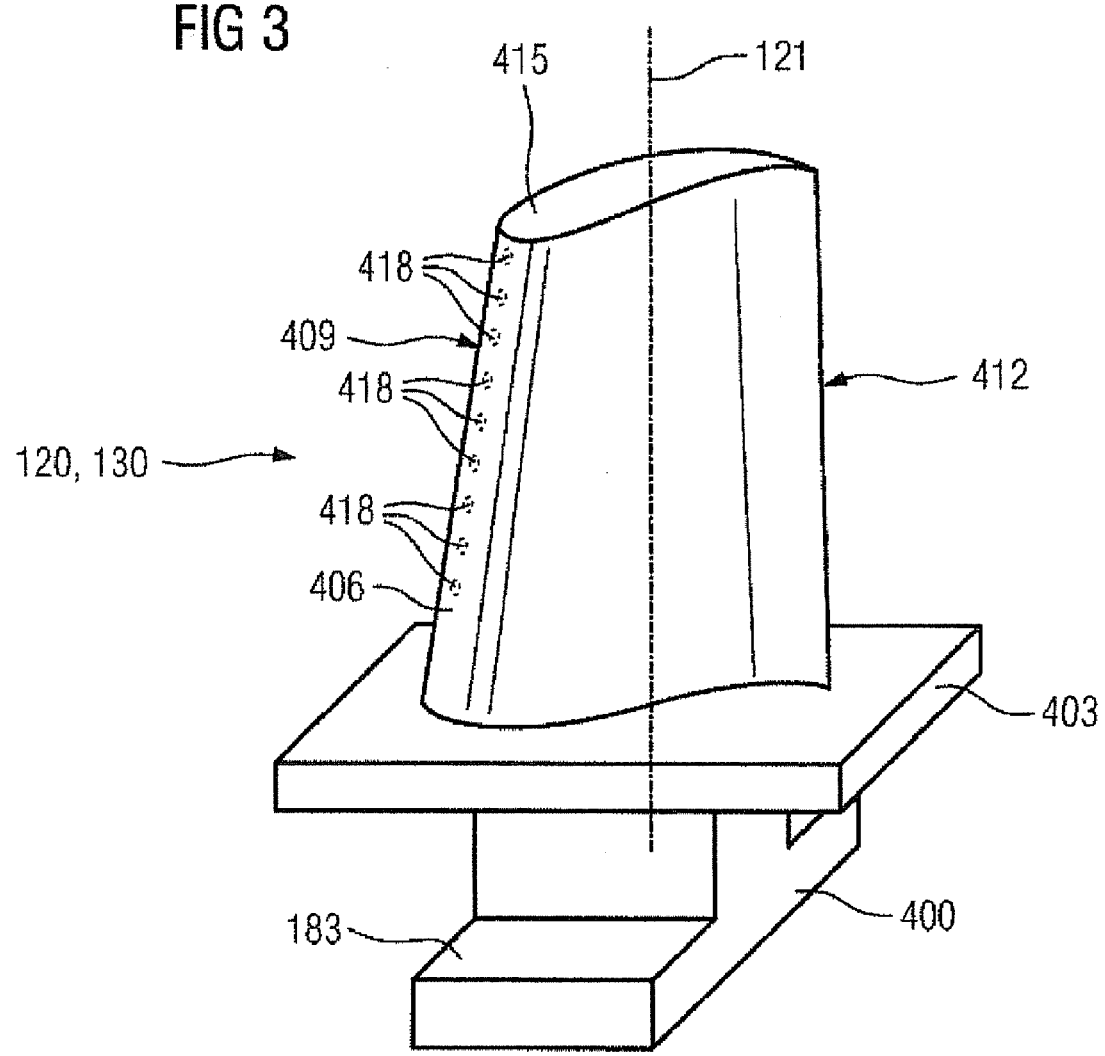
FIG. 3 shows a perspective view of a turbine blade or vane.

FIG. 3 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to faun the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy. The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-base protective coatings, it is also preferable to use nickel-base protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

Figure 4:
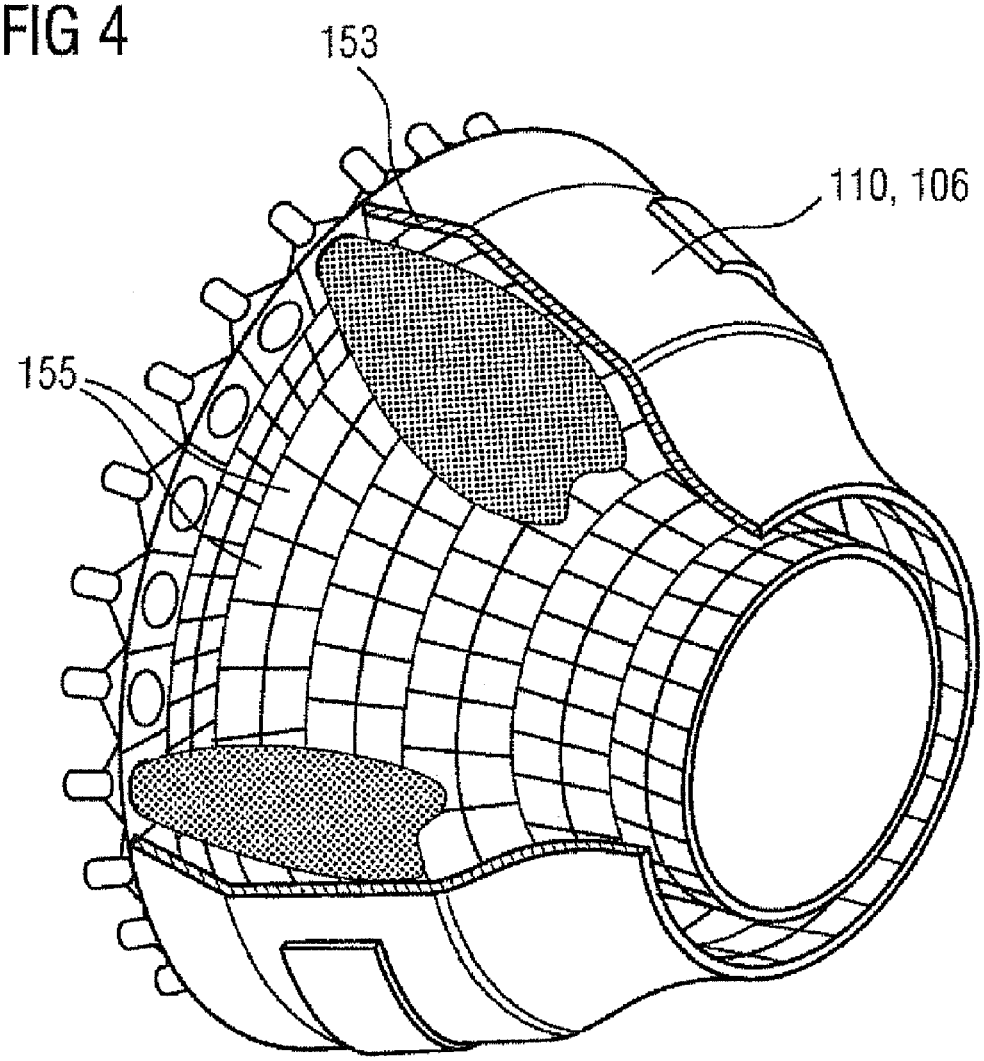
FIG. 4 shows a perspective view of a combustion chamber.

FIG. 4 shows a combustion chamber 110 of the gas turbine 100. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to faun part of the present disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sandblasting). Then, the corrosion and/or oxidation layers and products are removed. If appropriate, cracks in the turbine blade or vane 120, 130 or in the heat shield element 155 are also repaired. This is followed by recoating of the turbine blades or vanes 120, 130 or of the heat shield elements 155, after which the turbine blades or vanes 120, 130 or the heat shield elements 155 can be reused.

The invention claimed is:

1. A process for repairing wide gaps in a component by brazing at a brazing temperature,
    introducing a powder into a wide gap in the component wherein the powder does not melt at the brazing temperature;
    providing a filler metal on the component and over the powder in the wide gap, wherein the filler metal comprises a mixture of filler metal deposit and a plurality of deposit grains and the filler metal deposit melts at the brazing temperature and the deposit grains do not melt at the brazing temperature;
    heat treating the filler metal at the brazing temperature whereby the filler metal deposit melts and is introduced into the gap and the deposit grains remain on top of the powder and filler metal deposit in the gap, and do not fill the gap; and,
    removing the grain deposits from the component.

2. The process as claimed in claim 1,
    wherein the powder comprises a material of a substrate of the component.

3. The process as claimed in claim 2, wherein the powder consists of the material of the substrate.

4. The process as claimed in claim 1, wherein the powder comprises a ceramic.

5. The process as claimed in claim 1,
    wherein the wide gap is processed mechanically, before it is filled with the powder, in order to produce a defined contour.

6. The process as claimed in claim 1, wherein the substrate is a nickel-base or a cobalt-base superalloy.

7. The process as claimed in claim 1, wherein a wide gap width is greater than 1 mm.

8. The process as claimed in claim 1, wherein the wide gap width is between 1 mm and 3 mm.

9. The process as claimed in claim 1, wherein a wide gap depth is at least 1 mm.

* * * * *